United States Patent
Miller et al.

(10) Patent No.: US 7,802,058 B1
(45) Date of Patent: Sep. 21, 2010

(54) METHOD FOR PERFORMING CACHE COHERENCY IN A COMPUTER SYSTEM

(75) Inventors: Steven C. Miller, Livermore, CA (US); Martin M. Deneroff, Oakhurst, NJ (US); Kenneth C. Yeager, Sunnyvale, CA (US)

(73) Assignee: Silicon Graphics International, Fremont, CA (US)

( * ) Notice: Subject to any disclaimer, the term of this patent is extended or adjusted under 35 U.S.C. 154(b) by 202 days.

(21) Appl. No.: 10/837,057

(22) Filed: Apr. 30, 2004

Related U.S. Application Data

(60) Provisional application No. 60/467,102, filed on Apr. 30, 2003.

(51) Int. Cl.
 *G06F 12/08* (2006.01)
(52) U.S. Cl. .................. 711/141; 711/118; 711/142; 711/143
(58) Field of Classification Search .......... 711/118, 711/141, 142, 143
 See application file for complete search history.

(56) References Cited

U.S. PATENT DOCUMENTS 5,301,298 A * 4/1994 Kagan et al. ............. 711/141

2001/0035845 A1 * 11/2001 Zwern ........................ 345/8
2002/0007440 A1 * 1/2002 Hosoya et al. ........... 711/122
2003/0115423 A1 * 6/2003 Chang ...................... 711/145

OTHER PUBLICATIONS

Handy, Jim. "The Cache Memory Book", 1998, Academic Press, Second Edition, pp. 180-182.*

* cited by examiner

*Primary Examiner*—Sanjiv Shah
*Assistant Examiner*—Jae U Yu
(74) *Attorney, Agent, or Firm*—Baker Botts L.L.P.

(57) ABSTRACT

In a computing system, cache coherency is performed by selecting one of a plurality of coherency protocols for a first memory transaction. Cache coherency is performed on appropriate caches in the computing system in accordance with the selected one of the plurality of coherency protocols. For a second memory transaction, another selection is made of the plurality of coherency protocols. The selected one of the coherency protocols for the second memory transaction may be the same as or different from the selected one of the plurality of coherency protocols for the first memory transaction.

17 Claims, 1 Drawing Sheet

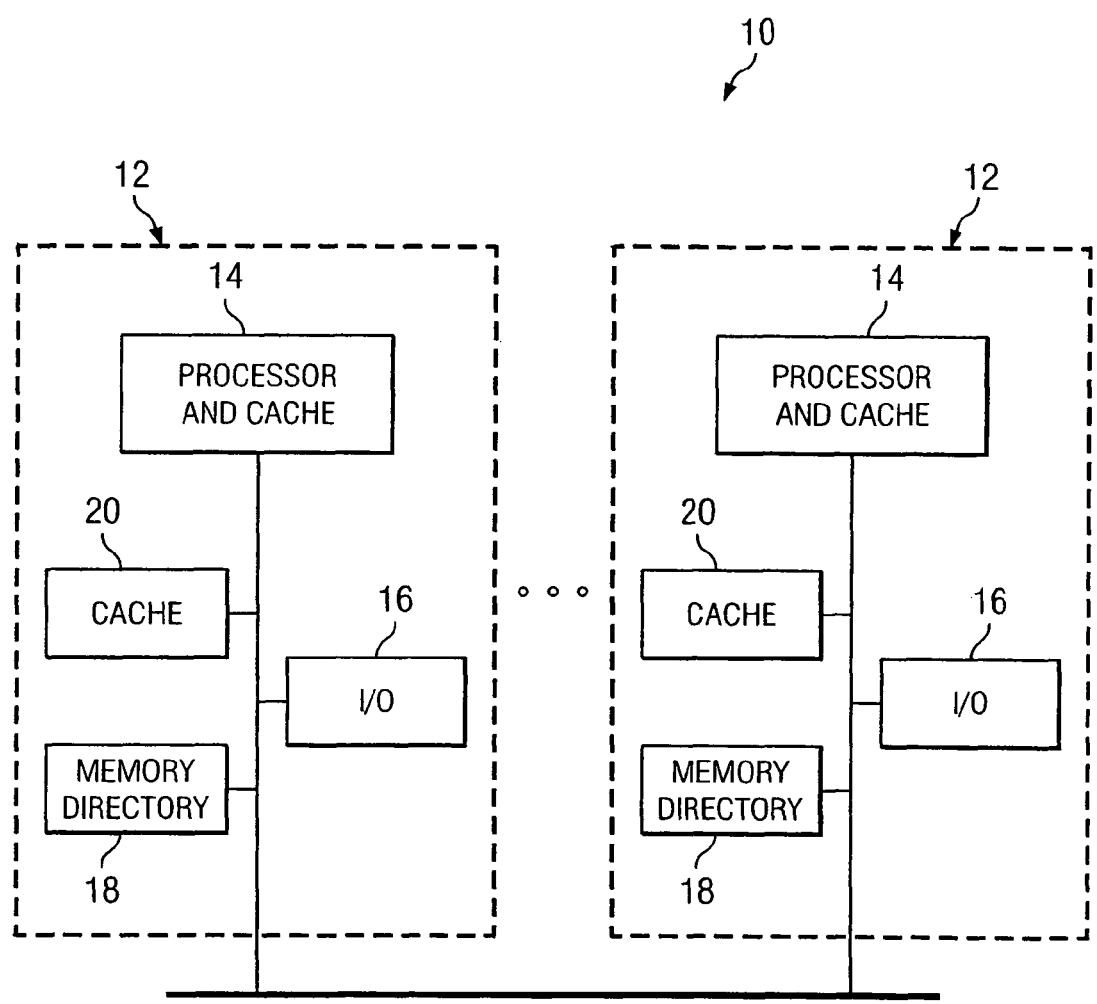

METHOD FOR PERFORMING CACHE COHERENCY IN A COMPUTER SYSTEM

CROSS REFERENCE TO RELATED APPLICATIONS

The present invention claims benefit to U.S. Provisional Application No. 60/467,102 filed Apr. 30, 2003 and incorporated herein by reference.

TECHNICAL FIELD OF THE INVENTION

The present invention relates in general to multi-processor computing systems and more particularly to a method for performing cache coherency in a computer system.

BACKGROUND OF THE INVENTION

In computer systems, there is a disparity between processor cycle time and memory access time. Since this disparity limits processor utilization, caches have been introduced to solve this problem. Caches, which are based on the principal of locality, provide a small amount of extremely fast memory directly connected to a processor to avoid the delay in accessing the main memory and reduce the bandwidth needed to the main memory. Even though caches significantly improve system performance, a coherency problem occurs as a result of the main memory being updated with new data while the cache contains old data. For shared multi-processor systems, a cache is almost a necessity since access latency to memory is further increased due to contention for the path to the memory. It is not possible for the operating system to ensure coherency since processors need to share data to run parallel programs and processors cannot share a cache due to bandwidth constraints.

Various algorithms and protocols have been developed to handle cache coherency. For example, in a directory based caching structure, a write invalidate scheme allows for a processor to modify the data in its associated cache at a particular time and force the other processors to invalidate that data in their respective caches. When a processor reads the data previously modified by another processor, the modifying processor is then forced to write the modified data back to the main memory. Though such a scheme handles cache coherency in theory, limitations in system performance are still apparent.

SUMMARY OF THE INVENTION

From the foregoing, it may be appreciated by those skilled in the art that a need has arisen for a scheme to provide significant performance benefits for cache coherency in a computer system. In accordance with the present invention, there is provided a method for performing cache coherency in a computing system that substantially eliminates or greatly reduces disadvantages and problems associated with conventional cache coherency techniques.

According to an embodiment of the present invention, there is provided a method of performing cache coherency in a computer system that includes selecting one of a plurality of coherency protocols for a first memory transaction. Cache coherency is performed for the first memory transaction on caches in the computer system in accordance with the one of the plurality of coherency protocols selected for the first memory transaction. The plurality of cache coherency protocols includes invalidation, update, exclusive, and update once. Each cache coherency protocol provides a specific process for maintaining cache coherency in a computing system. Selection of a cache coherency protocol can be performed on a dynamic basis for each memory transaction to be processed.

The present invention provides various technical advantages over conventional cache coherency techniques. For example, one technical advantage is the capability to selectively use other coherency and consistency mechanisms for memory update transactions. Another technical advantage is to develop a computer system with dramatically increased delivered performance with respect to other more standard computers designed with similar integrated circuit technology. Embodiments of the present invention may incorporate all, some, or none of these technical advantages while other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates an example multiprocessor computing system.

DETAILED DESCRIPTION OF THE INVENTION

FIG. 1 shows a simplified block diagram of a multiprocessor computing system 10. Computing system 10 includes a plurality of nodes 12. Each node includes a processor 14, input/output 16, a directory 18, and a cache 20. As shown, computing system 10 is a directory based multiprocessor system where data can be shared across all of the processors 14. As a result of data being shared throughout computing system 10, a coherency mechanism is used to track and update data in the various caches 20 to ensure that valid data is used during execution of applications. Various coherency protocols may be implemented within computing system 10. These coherency protocols may be dynamically selected for each cache and memory transaction performed in computing system 10. The coherency protocols may be associated with particular data stored within computing system 10 to facilitate selection of a specific coherency protocol. The technique of the present invention may be implemented as one or more software modules tangibly stored in computer readable medium including processors and memory residing anywhere within computing system 10.

Base Protocol

The computing system supports the base distributed shared memory model used in current systems: MESI cache coherency with system state maintained in a directory associated with main memory. Caches are copyback with read and write allocation. A three level cache structure may be employed, where the second level is inclusive of the first and the third level is a victim cache. The directory maintains a sharing vector for shared data, which identifies all caches holding copies. When a processor intends to perform a store to a line in shared state, it sends an upgrade request to the directory, which then sends Invalidate messages to all caches whose bit is set in the sharing vector. The directory also sends a sharing count back to the requesting node. When a node receives an Invalidate, it changes its cache state to Invalid and sends an Acknowledge message back to the requesting node. The requesting node counts the Acknowledges it receives, remaining stalled until the count matches the sharing count that the directory sent back. This guarantees sequential consistency, meaning that all processors in the system will see all modifications to a particular memory location in the same order, and that any processor will always see modifications to memory made by a particular processor in the same order that the program on that processor performs them.

Performance achieved by a system using only this protocol and consistency model should be considered the baseline against which the improvements of the present invention are compared. It is expected that this model is actually optimal for some programs, and frequently optimal for a significant subset of the data used by many programs. However, very large improvements can be achieved if other models can be selected for use on specific data used within a program.

It is possible to implement weak consistency in a MESI protocol, restricted to the specific situation of upgrades from Shared to Exclusive state. This is done by stalling only until the directory sends back the sharing count (instead of stalling until all acknowledgments have been received) and then using a SYNC instruction to stall until the total outstanding acknowledgment count goes to zero. The value of this capability is relatively small on most applications and, though this functionality may be included, the benefits of weakly ordered updates, discussed below, is expected to be much larger.

Update Protocol

An Update protocol is one in which data is not made exclusive before executing stores. Instead, store data is actually transmitted to all caches in the systems that hold copies of that data, and those caches update their copies accordingly. Updates may be implemented in concert with either sequential or weak consistency models. Update protocol has strong advantages in the following cases (other cases may benefit as well):

Data is shared at the same time—that is, one or more processors are writing the data in the same time period where one or more processors are reading the data. In many cases, sequential ordering is not required here.

Producer—consumer situations in which it is important to minimize the startup time for the consumer. MPI messages are a good example of this case: if the consumer first obtains a shared copy of the message buffer, the producer can 'push' the data directly into the consumer's cache, thus avoiding a cache miss when the consumer tries to access the data. Sequential ordering is usually not required in this application, since there is only one writer.

False sharing—This is a situation where data within a cache line is not actually shared; instead different portions of the line are private to two or more processors. As a result, in a MESI protocol, the line must be moved whenever one of the processors desires to perform a write of its data. Since updates do not require making the line exclusive, this problem is avoided.

Barriers—This is actually a special case of the first situation. All processors in a group must inform each other that they have reached a particular point in their program. Barriers require that sequential ordering be maintained, since processors are accumulating data in a location and must always add their result to that of the other processors.

Unfortunately, the Update protocol has some disadvantages. Since all writes are transmitted to all nodes that cache the data, the bandwidth reduction normally achieved by copy-back caches is eliminated. In most systems, individual messages would need to be sent by the directory to each cache holding a copy, generating traffic proportional to the number of stores times the number of sharers. Since interconnect bandwidth tends to be a scarce resource, excessive updates can lead to a performance reduction over MESI if the interconnect becomes saturated. This problem can be mitigated by a combination of careful selection of data to be maintained by updates and by incorporating hardware features to reduce the traffic generated by updates. Also, support for updates tends to be significantly more complex to implement than standard MESI systems. Large transistor counts implementable today make this less of an issue, although managing the complexity remains a problem.

The proposed implementation would include a processor, which can generate updates on selected data. Stores of a full word would generate update messages. Stores of less than a word would use MESI protocol for simplicity of hardware implementation. When in update mode, caches would use read allocation only. Performing a store would not cause a fill on a cache miss. This allows producers to avoid forcing out data and to cache data they are producing and will not consume. It may be worth performing write allocation as an optional implementation. Outgoing update messages would be sent to the directory and memory controller. The memory would be written, and a new cache update message would be sent to all caches marked in the sharing vector. The directory would also send a sharing count back to the originator of the update, so the originator knows how many acknowledges to expect. To reduce traffic, hardware would be implemented to fan out a single cache update within the routers at each vertex in the interconnection network, resulting in a maximum of one message traveling down any particular link for each update performed. This mechanism would also collapse the acknowledges on the way back, resulting in a maximum of one acknowledgment per update per link.

Upon receiving an update message, a node treats the update as an Invalidate to its primary cache and writes the data to its secondary cache. It also sends an acknowledgment back to the directory, which relays the acknowledgment back to the requestor. If the updated line is no longer cached, this fact is included in the acknowledgment message. The directory then clears the associated bit in the sharing vector though this is somewhat difficult if a coarse sharing vector is used.

If operating in sequential consistency mode, the requestor stalls until it has received all acknowledges for the update. If operating in weak consistency mode, it keeps count of the total number of expected acknowledgments, but does not stall until a SYNC instruction is executed. SYNC causes a stall until the outstanding acknowledgment count is zero. An intermediate mode may be needed wherein the processor stalls until it receives its own update back from the directory. This would support special memory operations.

In weak consistency mode, it is possible to use hardware 'write gatherers' to reduce update bandwidth by storing outgoing updates and coalescing multiple updates to the same line into a single larger transaction. The write gatherers would flush to the system when full, when another gatherer is needed and all are in use, and when a SYNC instruction executes. A single instruction or separate instructions may be used to flush the gatherers and to stall until the acknowledgments complete. Weak consistency should greatly reduce stall time in the writing processor, but does require that the programmer, or ideally the compiler or other 'smart' intermediary, know when it is safe to use. Most parallel programs, which use barriers to divide program phases, and most messaging systems, can safely use weak consistency except on the barriers themselves.

In very large systems, the system is currently divided into regions and only allow Exclusive (not Shared) access to data whose home is outside the requestor's region. This is done to control the size of the required sharing vector. Since write allocation is not used with updates, it seems possible that one could perform update-mode stores from outside the data's home region without acquiring the data exclusively and without growing the sharing vector.

Extra link bandwidth needed for selective updating cannot be predicted as it depends on how often the data is written. Updates are most useful when the reader needs to know the results of a different processor's writes quickly. Since this may consume significant bandwidth, it is important to restrict use of updates to situations where this is true. Predicting the proper use of updates by examining the source code only is not practical as a knowledge of the high level functionality of the code is needed. A wizard application may be useful in accomplishing this. It would also be possible to automatically choose coherency modes by gathering statistics about access patterns during execution and changing the modes dynamically.

Exclusive Protocol

A mechanism can be created wherein both Load and Store misses always request data in Exclusive state. This is desirable in cases where the programmer/compiler/other tool knows that the data is eventually going to be written in Exclusive state, and that no other processor will be accessing the data before the data is written. This condition certainly applies to private data, which is not ever shared, as well as public data, which is shared, but only during specific known intervals. If done correctly, this reduces Invalidate traffic in the system and associated stall time spent waiting for acknowledgments.

Exclusive data includes data that is private to an execution thread, data that is read by only one thread though it may be written by a different thread, and data that is known to be destined to be written but is initially accessed by a Load instruction. In this latter instance, it is also known that other threads will not usually be accessing the data between the Load and Store instructions. Compilers can detect some of these conditions. For other conditions, the programmer can specify the condition in an appropriate manner. It is possible to develop hardware and/or software to provide such detection automatically. For example, a wizard application may be implemented to provide a possible detection approach. The programmer's ability to specify coherency modes may be performed through new instructions, TLB entries, or special addresses. It may be beneficial to have a user level instruction that modifies the coherency fields in the TLB or page tables. Though difficult, performance benefits may be quantified in the context of a specific program fragment.

Non-Coherent Cached Access

An access mode can be implemented where a read receives the current snapshot of the requested data, but the directory does not take note of the caching and therefore does not send updates or invalidates. This of course eliminates all coherency overhead for this data, but creates numerous system issues.

Much academic research has suggested that allowing the software to use this mode and manage its own coherency is beneficial, but this work generally ignores issues of process migration, reclaiming of the memory at the end of the process, IO, etc. Strangely, it appears that completely private data gets no benefit from this treatment—it generates no coherency traffic if handled in Exclusive mode, which does not suffer from any of the issues described above.

Actually, this mechanism appears best suited to acquiring data produced by another thread after that thread finishes and generates some sort of completion event (message or barrier) which tells the consumer to pull in a new snapshot. To enable use of this mechanism, there must be a completely reliable way to guarantee that the user's store will miss in cache and not access stale (un-updated) cached data. The obvious FLUSH instruction doesn't necessarily do the job in the presence of an operating system. It is always possible for the thread to flush the cache, then be suspended and restarted on another processor. This can occur between execution of the flush (on processor 1) and the load (on processor 2). In that case, the cache could hit on stale information, and the user thread would never know. It would seem the operating system would need to track all non-coherent data and guarantee proper flushing when it restarts a thread.

Update Once Protocol

An interesting variant is something termed Update Once protocol, modeled after the conventional Write Once protocol originally used for copyback caches. This is an attempt to have the hardware automatically select between Update and Invalidate mechanisms. By default, the first write to a cache line generates an update. If an update from a second processor has not been received before the processor attempts a second write to the same line, the hardware assumes the line is not being actively shared and issues an Invalidate instead of an update and converts the line to exclusive state. This approach is useful for situations with multiple writers, but not for the other cases discussed above where updates may add value. It therefore seems necessary to offer pure update mode as well. With the various protocols, coherency mode decisions can be made dynamically.

Coherency States and Actions

This section discusses the system behavior for the various cache states under the extended coherency model needed to support the functions described above. As usual, stable cache states are Modified, Exclusive, Shared, and Invalid. Directory states are Exclusive, Shared, and Invalid. Additional transitional states used in implementation are not discussed here. The cache tags include an Update Sent (US) bit that is used to implement the Update Once protocol.

| Cache in Invalid State - coherency actions | | | | |
|---|---|---|---|---|
| Event | Invalidate Protocol | Update Protocol | Update Once Protocol | Exclusive Protocol |
| Load Instruction - Dir I state | Send data; Dir & cache -> E | Send data; Dir & cache -> S | Send data; Dir & cache -> S | Send data; Dir & cache -> E |
| Load Instruction - Dir S state | Send data; Dir & cache -> S | Send data; Dir & cache -> S | Send data; Dir & cache -> S | Send Invalidate to sharers; send data; Dir & cache -> E |
| Load Instruction - Dir E state | Send downgrade to owner; owner sends data; Dir & caches -> S | Send downgrade to owner; owner sends data; Dir & caches -> S | Send downgrade to owner; owner sends data; Dir & caches -> S | Send Invalidate to owner; owner sends data; Dir & caches -> E |
| Store Instruction - Dir I state | Send data; Dir -> E & cache -> M | Update memory; No state change | Update memory; No state change | Send data; Dir -> E & cache -> M |
| Store Instruction - Dir S state | Send Invalidate to sharers; send data; Dir -> E & cache -> M | Update memory and sharers; No state change | Update memory and sharers; No state change | Send Invalidate to sharers; send data; Dir -> E & cache -> M |
| Store Instruction - Dir E state | Send Invalidate to owner; owner sends data; Dir -> E & cache -> M | Update memory and owner; No state change | Update memory and owner; No state change | Send Invalidate to owner; owner sends data; Dir -> E & cache -> M |
| Invalidate Received | Acknowledge | Acknowledge | Acknowledge | Acknowledge |
| Update Received | Acknowledge Invalid; dir removes from sharing vector | Acknowledge Invalid; dir removes from sharing vector | Acknowledge Invalid; dir removes from sharing vector | Acknowledge Invalid; dir removes from sharing vector |

| Cache in Shared State (Directory will also be in S state) - coherency actions | | | | |
|---|---|---|---|---|
| Event | Invalidate Protocol | Update Protocol | Update Once Protocol* | Exclusive Protocol |
| Load Instruction | Cache hit - no action | Cache hit - no action | Cache hit - no action | **Cache Hit - no action |
| Store Instruction | Send upgrade request; Dir sends Invalidates to sharers; Dir -> E & cache -> M | Update memory and all sharers; Dir & cache -> S | IF (not US) {set US; Update memory and all sharers; Dir & cache -> S} Else {Send upgrade request; Dir sends Invalidates to sharers; Dir -> E & cache -> M} | **Send upgrade request; Dir sends Invalidates to sharers, Dir -> E & cache -> M |
| Invalidate Received | Cache -> I; Dir -> E (pointing at new owner) | Cache -> I; Dir -> E (pointing at new owner) | Cache -> I; Dir -> E (pointing at new owner) | **Cache -> I; Dir -> E (pointing at new owner) |
| Update Received | Update cache; send Ack; No state change | Update cache; send Ack; No state change | Update cache; send Ack; clear US | **Update cache; send Ack; No state change |

*Note US bit is always cleared by transition out of S state
** Unexpected cache state for this protocol

| | Cache in Exclusive State (Directory will also be in E state) - coherency actions | | | |
|---|---|---|---|---|
| Event | Invalidate Protocol | Update Protocol | Update Once Protocol* | Exclusive Protocol |
| Load Instruction | Cache hit - no action | Cache hit - no action | Cache hit - no action | Cache hit - no action |
| Store Instruction | Cache –> M | ? Either Cache –> M or Send Update to memory; Update memory Dir & cache –> S? | Cache –> M | Cache –> M |
| Invalidate Received | Cache –> I; Dir –> E (pointing at new owner) | Cache –> I; Dir –> E (pointing at new owner) | Cache –> I; Dir –> E (pointing at new owner) | Cache –> I; Dir –> E (pointing at new owner) |
| Update Received | Update cache; send Ack; No state change | Update cache; send Ack; No state change | Update cache; send Ack; No state change | **?Update cache; send Ack; No state change |
| Shared Intervention Received | Cache & Dir –> S; send Clean Ack | Cache & Dir –> S; send Clean Ack | Cache & Dir –> S; send Clean Ack | Cache & Dir –> S; send Clean Ack |
| Exclusive Intervention Received | Cache –> I Dir –> E (points to new owner); send Clean Ack | Cache –> I Dir –> E (points to new owner); send Clean Ack | Cache –> I Dir –> E (points to new owner); send Clean Ack | Cache –> I Dir –> E (points to new owner); send Clean Ack |

**Not an expected event in this protocol

| | Cache in Modified State (Directory will be in E state) - coherency actions | | | |
|---|---|---|---|---|
| Event | Invalidate Protocol | Update Protocol | Update Once Protocol* | Exclusive Protocol |
| Load Instruction | Cache hit - no action | Cache hit - no action | Cache hit - no action | Cache hit - no action |
| Store Instruction | Cache hit - no action | ? Either Cache hit no action or Send Update to memory; Update memory Dir & cache –> S? | Cache hit - no action | Cache hit - no action |
| Invalidate Received | Cache –> I; Dir –> E (points to new owner) | Cache –> I; Dir –> E (points to new owner) | Cache –> I; Dir –> E (points to new owner) | Cache –> I; Dir –> E (points to new owner) |
| Update Received | Update cache; send Ack; No state change | Update cache; send Ack; No state change | Update cache; send Ack; No state change | **?Update cache; send Ack; No state change |
| Shared Intervention Received | Cache & Dir –> S; send Dirty Ack & data (data is written back and sent to requestor) | Cache & Dir –> S; send Dirty Ack & data (data is written back and sent to requestor) | Cache & Dir –> S; send Dirty Ack & data (data is written back and sent to requestor) | Cache & Dir –> S; send Dirty Ack & data (data is written back and sent to requestor) |
| Exclusive Intervention Received | Cache –> I Dir –> E (points to new owner); send Dirty Ack & data (data is written back | Cache –> I Dir –> E (points to new owner); send Dirty Ack & data (data is written back | Cache –> I Dir –> E (points to new owner); send Dirty Ack & data (data is written back | Cache –> I Dir –> E (points to new owner); send Dirty Ack & data (data is written back |

-continued

| | Cache in Modified State (Directory will be in E state) - coherency actions | | | |
|---|---|---|---|---|
| Event | Invalidate Protocol | Update Protocol | Update Once Protocol* | Exclusive Protocol |
| | written back and sent to requestor) | and sent to requestor) | and sent to requestor) | and sent to requestor) |

**Not an expected event in this protocol

In summary, the goal of is to develop a computer with dramatically increased delivered performance with respect to other more standard computers designed with similar integrated circuit technology. The application space of interest is defense-related and tends to use very large datasets, which are often accessed in a sparse, and sometimes random, pattern. Integer arithmetic has equal or greater importance as floating point. To achieve this goal, a variety of new hardware and software mechanisms are incorporated. Focus is placed on those mechanisms relating to cache coherency and memory consistency. The target system will be a shared memory multiprocessor which employs a directory for cache coherency and a high bandwidth interconnect network to transmit information between nodes. Most current systems of this type employ writeback caches, MESI protocols, and sequential ordering memory models. Significant performance can be gained by adding the capability to selectively use other coherency and consistency mechanisms for memory update transactions.

Thus, it is apparent that there has been provided, in accordance with the present invention, a method for performing cache coherency in a computer system that satisfies the advantages set forth above. Although the present invention has been described in detail, it should be understood by those skilled in the art that various changes, substitutions, and alterations may be readily ascertainable by those skilled in the art and may be made herein without departing from the spirit and scope of the present invention as defined by the following claims. Moreover, the present invention is not intended to be limited in any way by any statement made herein that is not reflected in the appended claims.

What is claimed is:

1. A method for performing cache coherency in a computer system, comprising:
    selecting a first one of a plurality of coherency protocols for a first memory transaction;
    performing cache coherency for the first memory transaction on caches in the computer system by applying a first set of cache states to cached data in accordance with the first one of the plurality of coherency protocols selected for the first memory transaction;
    selecting a second one of a plurality of coherency protocols for a second memory transaction, the second one of the plurality of coherency protocols selected for the second memory transaction being different than the first one of the plurality of coherency protocols selected for the first memory transaction;
    performing cache coherency for the second memory transaction on caches in the computer system by applying a second set of cache states to cached data in accordance with the second one of the plurality of coherency protocols selected for the second memory transaction;
    wherein selection among the plurality of cache coherency protocols is performed on a dynamic basis for each separate memory transaction to be processed.

2. The method of claim 1, wherein the selected one of the plurality of coherency protocols is a write invalidate protocol.

3. The method of claim 2, wherein the write invalidate protocol generates invalidate messages in response to a change in data pursuant to the first memory transaction for caches in the computer system holding a copy of the data.

4. The method of claim 1, wherein the selected one of the plurality of coherency protocols is an update protocol.

5. The method of claim 4, wherein the update protocol does not make data associated with the first memory transaction exclusive before executing memory location stores.

6. The method of claim 5, wherein new data to be stored is transmitted to all caches in a computing system that hold copies of the original data.

7. The method of claim 1, wherein the selected one of the plurality of coherency protocols is an exclusive protocol.

8. The method of claim 7, wherein data associated with the first memory transaction is requested to be placed into an exclusive state in response to the data not being stored on a local cache associated with the origination of the first memory transaction.

9. The method of claim 1, wherein the selected one of the plurality of coherency protocols is an update once protocol.

10. A computer readable medium tangibly storing code for performing cache coherency in a computer system, the code operable to:
    select a first one of a plurality of coherency protocols for a first memory transaction;
    perform cache coherency for the first memory transaction on caches in the computer system by applying a first set of cache states to cached data in accordance with the first one of the plurality of coherency protocols selected for the first memory transaction;
    select a second one of a plurality of coherency protocols for a second memory transaction, the second one of the plurality of coherency protocols selected for the second memory transaction being different than the first one of the plurality of coherency protocols selected for the first memory transaction;
    perform cache coherency for the second memory transaction on caches in the computer system by applying a second set of cache states to cached data in accordance with the second one of the plurality of coherency protocols selected for the second memory transaction;
    wherein selection among the plurality of cache coherency protocols is performed on a dynamic basis for each separate memory transaction to be processed.

11. The computer readable medium of claim 10, wherein the plurality of coherency protocols includes an invalidate protocol, an update protocol, an exclusive protocol, and an update once protocol.

12. The computer readable medium of claim 10, wherein the code is further operable to:
    update a directory associated with each cache pursuant to the selected one of the plurality of coherency protocols.

13. The computer readable medium of claim 10, wherein each of the plurality of coherency protocols is associated with particular data.

14. A system for performing cache coherency in a computer system, comprising:
    means for selecting a first one of a plurality of coherency protocols for a first memory transaction;
    means for performing cache coherency for the first memory transaction on caches in the computer system by applying a first set of cache states to cached data in accordance with the first one of the plurality of coherency protocols selected for the first memory transaction;
    means for selecting a second one of a plurality of coherency protocols for a second memory transaction, the second one of the plurality of coherency protocols selected for the second memory transaction being different than the first one of the plurality of coherency protocols selected for the first memory transaction;
    means for performing cache coherency for the second memory transaction on caches in the computer system by applying a second set of cache states to cached data in accordance with the second one of the plurality of coherency protocols selected for the second memory transaction;
    wherein selection among the plurality of cache coherency protocols is performed on a dynamic basis for each memory transaction type to be processed.

15. The system of claim 14, wherein the plurality of coherency protocols includes an invalidate protocol, an update protocol, an exclusive protocol, and an update once protocol.

16. The system of claim 14, further comprising:
    updating a directory associated with each cache pursuant to the selected one of the plurality of coherency protocols.

17. The system of claim 14, wherein each of the plurality of coherency protocols is associated with particular data.

* * * * *